US011995474B2

(12) United States Patent
Nishizaki

(10) Patent No.: US 11,995,474 B2
(45) Date of Patent: May 28, 2024

(54) NON-TRANSITORY COMPUTER-READABLE MEDIUM, MANAGEMENT APPARATUS, RELAY APPARATUS AND DISPLAY CONTROL METHOD

(71) Applicant: BROTHER KOGYO KABUSHIKI KAISHA, Nagoya (JP)

(72) Inventor: Takashi Nishizaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 450 days.

(21) Appl. No.: 17/488,712

(22) Filed: Sep. 29, 2021

(65) Prior Publication Data

US 2022/0138011 A1    May 5, 2022

(30) Foreign Application Priority Data

Oct. 30, 2020 (JP) ................................. 2020-182849

(51) Int. Cl.
*G06F 13/10* (2006.01)
*G06F 9/50* (2006.01)

(52) U.S. Cl.
CPC .................. *G06F 9/5027* (2013.01)

(58) Field of Classification Search
CPC .... G06F 9/5027; G06F 3/1224; G06F 3/1292; G06F 3/1203
See application file for complete search history.

(56) References Cited

U.S. PATENT DOCUMENTS

| 10,810,049 | B2 * | 10/2020 | Kramer | G06F 9/5072 |
| 2002/0021902 | A1 * | 2/2002 | Hosoda | H04N 1/00965 |
| | | | | 396/429 |
| 2005/0281566 | A1 | 12/2005 | Kaneko | |
| 2010/0211535 | A1 * | 8/2010 | Rosenberger | G06F 16/48 |
| | | | | 706/20 |
| 2016/0006901 | A1 * | 1/2016 | Torigoshi | H04L 41/24 |
| | | | | 358/1.15 |
| 2016/0224291 | A1 * | 8/2016 | Ishino | G06F 3/1236 |
| 2016/0226953 | A1 * | 8/2016 | Ishino | H04L 67/10 |

(Continued)

FOREIGN PATENT DOCUMENTS

JP          2006-40258 A    2/2006

*Primary Examiner* — Kevin L Young
*Assistant Examiner* — Abdou K Seye
(74) *Attorney, Agent, or Firm* — KENEALY VAIDYA LLP

(57) ABSTRACT

A non-transitory computer-readable medium storing a display control program readable by a computer of a relay apparatus of a terminal management system having a management apparatus, the relay apparatus, and a terminal apparatus, the display control program, when executed by the computer, causing the relay apparatus to perform: obtaining, from the management apparatus, execution timing information indicating an execution timing of a relay application configured to relay data between the management apparatus and the terminal apparatus via the relay apparatus, the relay application being activated by a user's activation operation performed on the relay apparatus; and based on the execution timing information obtained, setting a reservation for executing display processing of displaying, on the relay apparatus, an activation notification image prompting the user to activate the relay application when the execution timing comes.

9 Claims, 8 Drawing Sheets

(56) References Cited

U.S. PATENT DOCUMENTS

| | | | |
|---|---|---|---|
| 2017/0163843 A1* | 6/2017 | Ma | H04N 1/00204 |
| 2019/0087139 A1* | 3/2019 | Tokuchi | G06F 3/1204 |
| 2020/0089445 A1* | 3/2020 | Morimoto | G06F 3/1279 |
| 2020/0120231 A1* | 4/2020 | Kanoh | H04N 1/00214 |
| 2021/0208830 A1* | 7/2021 | Kunimoto | G06F 3/1285 |

* cited by examiner

FIG. 4

```
ClientInfo
{
  "client_id": "B8:85:2F:05:D8:32",
  "client_type": "MobileApp",
  "client_version": "1.0"
  "client_settings": {
     ******
     ******
  }
}
```

```
ActionInfo
{
  "action_id": "abcdefg12345",
  "action_type": "ReserveNotification",
  "action_contents": {
    "datetime":"********"
  }
}
```

NON-TRANSITORY COMPUTER-READABLE MEDIUM, MANAGEMENT APPARATUS, RELAY APPARATUS AND DISPLAY CONTROL METHOD

CROSS-REFERENCE TO RELATED APPLICATIONS

This application is based on and claims priority under 35 USC 119 from Japanese Patent Application No. 2020-182849 filed on Oct. 30, 2020, the contents of which are incorporated herein by reference.

TECHNICAL FIELD

The present disclosure relates to technology of managing a terminal apparatus.

BACKGROUND

A related art discloses that processing for each data communication between an image forming apparatus and a relay apparatus and between a management apparatus and the relay apparatus is executed by a relay application that is activated in the relay apparatus.

SUMMARY

One illustrative aspect of the present disclosure provides a non-transitory computer-readable medium storing a display control program readable by a computer of a relay apparatus of a terminal management system, the terminal management system having a management apparatus, the relay apparatus, and a terminal apparatus, the management apparatus and the relay apparatus being configured to perform communication with each other, the relay apparatus and the terminal apparatus being configured to perform communication with each other, the display control program, when executed by the computer, causing the relay apparatus to perform: obtaining execution timing information from the management apparatus, the execution timing information indicating an execution timing of a relay application, the relay application being configured to relay data between the management apparatus and the terminal apparatus via the relay apparatus, and the relay application being activated by a user's activation operation performed on the relay apparatus; and based on the execution timing information obtained, setting a reservation for executing display processing when the execution timing comes, the display processing including displaying, on the relay apparatus, an activation notification image prompting the user to activate the relay application.

According thereto, it may display the activation notification image on the relay apparatus when the execution timing designated on the management apparatus-side comes. Accordingly, it may increase the frequency of causing the user of the relay apparatus to recognize the activation notification image displayed on the relay apparatus at the execution timing and causing the user of the relay apparatus to execute an activation operation of the relay application at the execution timing. Specifically, it may increase the frequency that the relay application is activated when the execution timing designated on the management apparatus-side comes. Thereby, it may suppress occurrence of a situation where data cannot be relayed between the management apparatus and the terminal apparatus, and may improve reliability of management on the terminal apparatus by the management apparatus.

Still another illustrative aspect of the present disclosure provides a relay apparatus configured to perform communication with a terminal apparatus and to perform communication with a management apparatus, the relay apparatus including: a display; an input interface; and a controller configured to: obtain execution timing information from the management apparatus, the execution timing information indicating an execution timing of a relay application, the relay application being configured to relay data between the management apparatus and the terminal apparatus via the relay apparatus, the relay application being activated by a user's activation operation performed on the input interface; and based on the execution timing information obtained, set a reservation for executing display processing when the execution timing comes, the display processing including displaying, on the display, an activation notification image prompting the user to activate the relay application.

According thereto, it may achieve the effects similar to the display control program of the present disclosure.

Still another illustrative aspect of the present disclosure provides a display control method executed by a relay apparatus, the relay apparatus being configured to perform communication with a terminal apparatus and to perform communication with a management apparatus, the display control method including: obtaining execution timing information from the management apparatus, the execution timing information indicating an execution timing of a relay application, the relay application being configured to relay data between the management apparatus and the terminal apparatus via the relay apparatus, the relay application being activated by a user's activation operation performed on the relay apparatus; and based on the execution timing information obtained, setting a reservation for executing display processing when the execution timing comes, the display processing including displaying, on the relay apparatus, an activation notification image for prompting the user to activate the relay application.

According thereto, it may achieve the effects similar to the non-transitory computer-readable medium storing the display control program of the present disclosure by executing the method.

BRIEF DESCRIPTION OF DRAWINGS

Illustrative embodiments of the disclosure will be described in detail based on the following figures, wherein:

FIG. 4 shows a registration data table;

DETAILED DESCRIPTION

In a case that the relay apparatus is a mobile terminal that is carried by an operator who performs an operation of using the image forming apparatus, it is difficult to activate a relay application all the time, so as to suppress power consumption of a battery mounted on the mobile terminal.

For this reason, if the operator forgets to perform an activation operation of activating the relay application, data cannot be relayed between the image forming apparatus and the management apparatus, so that the management apparatus cannot appropriately manage the image forming apparatus, which deteriorates reliability of management.

Therefore, one illustrative aspect of the present disclosure improves reliability of management.

Hereinafter, an illustrative embodiment of the present disclosure will be described with reference to the drawings.

(1) Configuration of Terminal Management System 1

Figure 1:
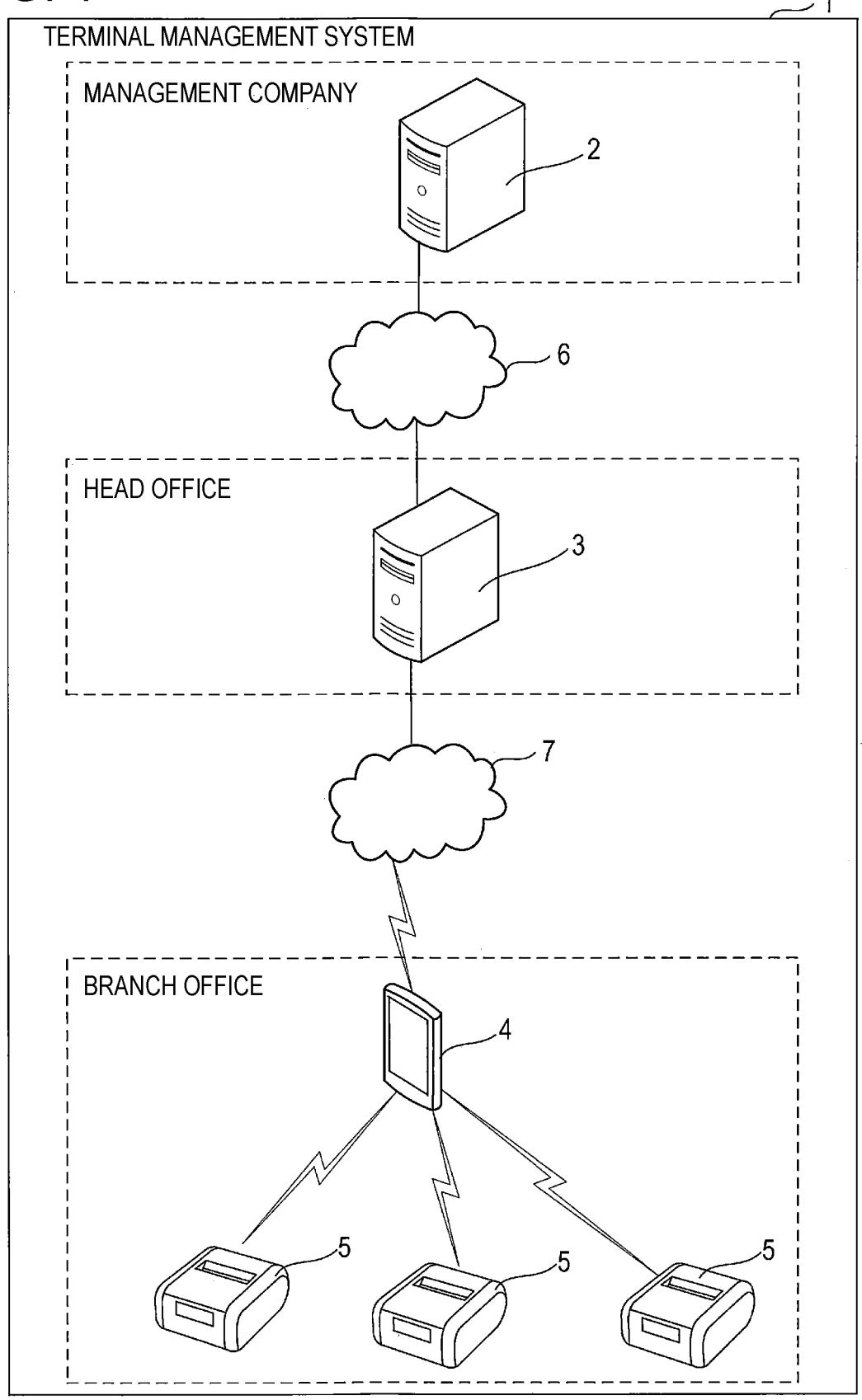
FIG. 1 shows a configuration of a terminal management system.

As shown in FIG. 1, a terminal management system 1 of the present illustrative embodiment includes a centralized management apparatus 2, a terminal management apparatus 3, a plurality of mobile terminals 4 and a plurality of printers 5. In FIG. 1, for simple illustration, one mobile terminal 4 is shown.

The centralized management apparatus 2 and the terminal management apparatus 3 are configured to perform communication with each other via a WAN 6. The WAN is an abbreviation of Wide Area Network. In the present illustrative embodiment, the WAN 6 is the Internet.

The terminal management apparatus 3 and the mobile terminal 4 are configured to perform communication with each other via a WAN 7. In the present illustrative embodiment, the WAN 7 is a $4^{th}$-generation mobile communication network.

The mobile terminal 4 and the printer 5 are configured to perform communication with each other by short-range wireless communication conforming to Bluetooth standards or wired communication using a USB. The USB is an abbreviation of Universal Serial Bus. Bluetooth is a registered trademark.

In the terminal management system 1 of the present illustrative embodiment, collection of information from the printer 5 by the centralized management apparatus 2, execution of test printing by the printer 5 based on an instruction from the centralized management apparatus 2, change of a setting of the printer 5 based on an instruction from the centralized management apparatus 2, and the like can be implemented.

As an example of a place in which each of the apparatuses configuring the terminal management system 1 is equipped, the terminal management apparatus 3 is equipped at a head office of a company, and the mobile terminal 4 and the printer 5 are equipped at a branch office of the company.

In this case, information (hereinafter, referred to as printer information) about the plurality of printers 5 that is managed at the branch office of the company is collected by the terminal management apparatus 3 equipped at the head office of the company. The printer information collected by the terminal management apparatus 3 is collected and managed by the centralized management apparatus 2 that is operated by a management company different from the company, for example. However, the centralized management apparatus 2 may also be operated by the company, and it is optional whether the company and the management company are separate companies.

There may also be a plurality of terminal management apparatuses 3. In this case, the plurality of terminal management apparatuses 3 may be managed by one centralized management apparatus 2. For example, the terminal management apparatus 3 may be each equipped at each of a plurality of companies, and the plurality of terminal management apparatuses 3 may be managed by one centralized management apparatus 2 equipped at the management company.

Figure 2A:
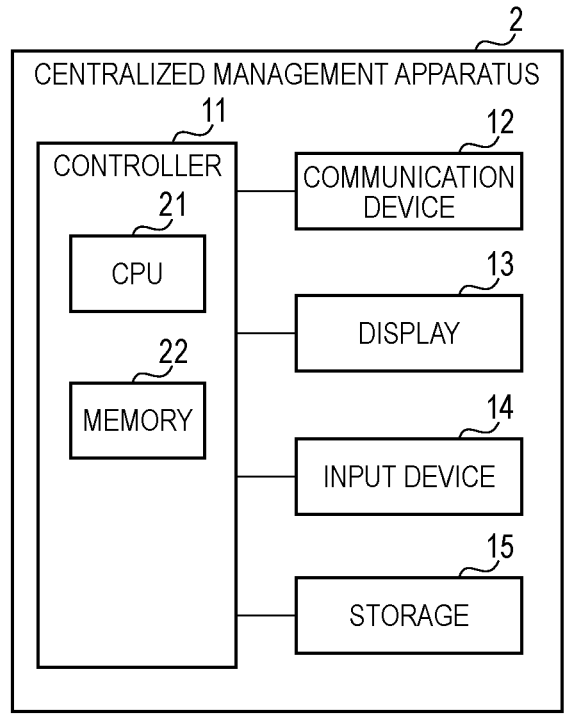
FIG. 2A is a block diagram showing a configuration of a centralized management apparatus.

As shown in FIG. 2A, the centralized management apparatus 2 includes a controller 11, a communication device 12, a display 13, an input device 14 and a storage 15.

The controller 11 includes a CPU 21 and a memory 22. The CPU is an abbreviation of Central Processing Unit. The CPU 21 is configured to execute a program stored in the memory 22, thereby implementing a variety of functions of the centralized management apparatus 2. Note that, a variety of functions implemented by the controller 11 are not limited to the configuration where they are implemented by the execution of the program. For example, some or all of the functions may also be implemented using one or more hardware. The memory 22 includes a semiconductor memory (for example, a ROM, a RAM, and a flash memory) that is a non-transitory tangible recording medium, and stores programs and data.

The communication device 12 is configured to perform data communication with the terminal management apparatus 3 via the WAN 6. The display 13 includes a display device (not shown), and is configured to display diverse images on the display device. The input device 14 is configured to receive an input operation performed via a keyboard and a mouse (not shown) by a user and to output input operation information for specifying the input operation. The storage 15 includes an auxiliary storage device such as an HDD and an SSD, for example, and stores a variety of data. The HDD is an abbreviation of Hard Disk Drive. The SSD is an abbreviation of Solid State Drive.

Figure 2B:
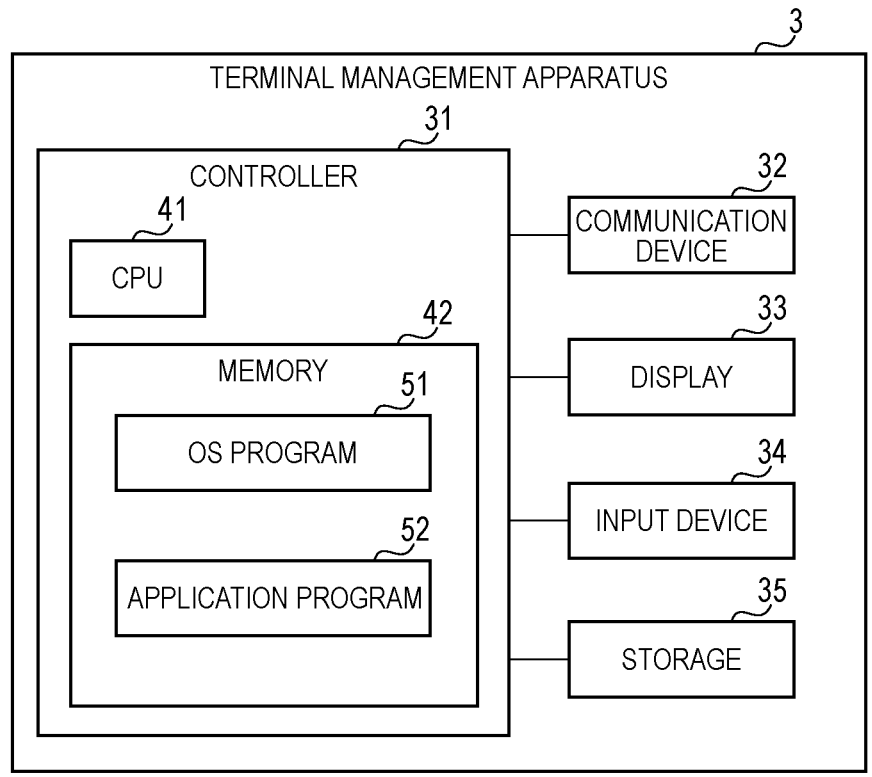
FIG. 2B is a block diagram showing a configuration of a terminal management apparatus.

As shown in FIG. 2B, the terminal management apparatus 3 includes a controller 31, a communication device 32, a display 33, an input device 34 and a storage 35.

The controller 31 includes a CPU 41 and a memory 42. The CPU 41 is configured to execute a program stored in the memory 42, thereby implementing a variety of functions of the terminal management apparatus 3. Note that, a variety of functions implemented by the controller 31 are not limited to the configuration where they are implemented by the execution of the program. For example, some or all of the functions may also be implemented using one or more hardware.

The memory 42 includes a semiconductor memory (for example, a ROM, a RAM, and a flash memory) that is a non-transitory tangible recording medium. The memory 42 stores an operating system (hereinafter, referred to as 'OS') program 51 and an application program 52.

The OS program 51 is a program for providing basic functions of the terminal management apparatus 3. The application program 52 is an application (hereinafter, referred to as 'web application') program configured to mediate the centralized management apparatus 2 and the mobile terminal 4 each other so as to manage the printer 5 by the centralized management apparatus 2.

The communication device 32 is configured to perform data communication with the centralized management apparatus 2 via the WAN 6 and to perform data communication with the mobile terminal 4 via the WAN 7. The display 33 includes a display device (not shown), and is configured to display diverse images on the display device. The input device 34 is configured to output input operation information for specifying an input operation performed via a keyboard and a mouse (not shown) by a user. The storage 35 includes an auxiliary storage device such as an HDD and an SSD, for example, and stores a variety of data.

Figure 3A:
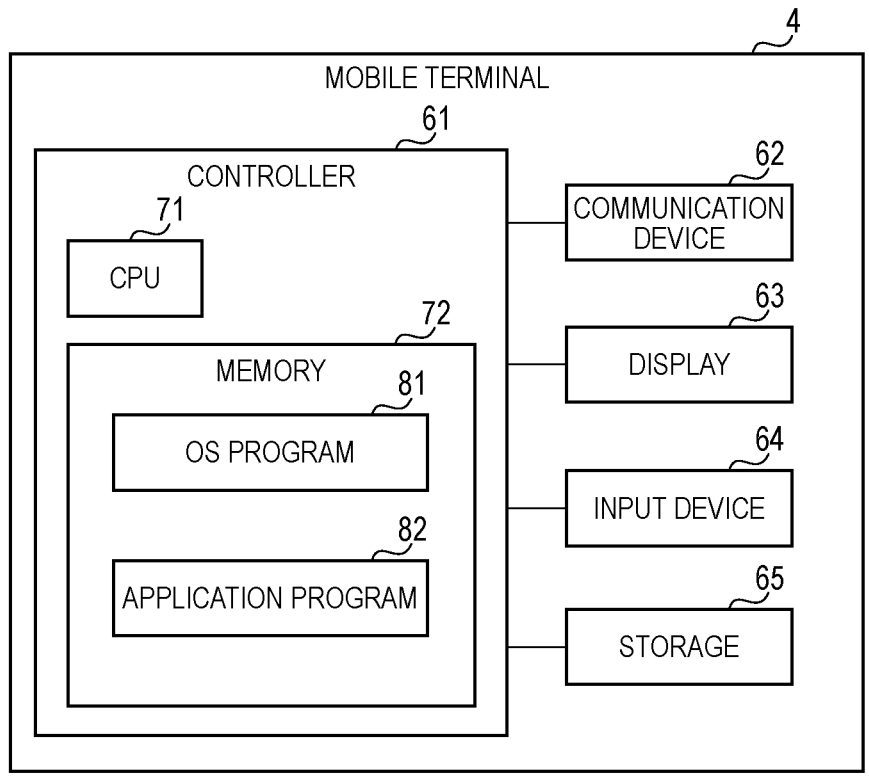
FIG. 3A is a block diagram showing a configuration of a mobile terminal.

The mobile terminal 4 is allotted to each operator who performs an operation of using the printer 5, and is carried by the operator. As shown in FIG. 3A, the mobile terminal 4 includes a controller 61, a communication device 62, a display 63, an input device 64 and a storage 65.

The controller 61 includes a CPU 71 and a memory 72. The CPU 71 is configured to execute a program stored in the memory 72, thereby implementing a variety of functions of the mobile terminal 4. Note that, a variety of functions implemented by the controller 61 are not limited to the configuration where they are implemented by the execution of the program. For example, some or all of the functions may also be implemented using one or more hardware.

The memory 72 includes a semiconductor memory (for example, a ROM, a RAM, and a flash memory) that is a non-transitory tangible recording medium. The memory 72 stores an OS program 81 and an application program 82.

The OS program 81 is a program for providing basic functions of the mobile terminal 4. The application program 82 is an application (hereinafter, referred to as 'mobile application') program configured to mediate the terminal management apparatus 3 and the printer 5 each other so as to manage the printer 5 by the centralized management apparatus 2.

The communication device 62 is configured to perform data communication with the terminal management apparatus 3 via the WAN 7. The communication device 62 is configured to perform data communication with the printer 5 by short-range wireless communication conforming to Bluetooth standards or wired communication using a USB.

The display 63 includes a display device (not shown), and is configured to display diverse images on the display device. The input device 64 includes a touch panel provided on a display screen of the display 63, and a switch provided at the periphery of the display screen of the display 63. The input device 64 is configured to output input operation information for specifying an input operation performed via the touch panel and the switch by the operator. The storage 65 includes an auxiliary storage device such as an HDD and an SSD, for example, and stores a variety of data.

On the display screen of the display 63, an application icon for activating the application program 82 is displayed. When the operator who carries the mobile terminal 4 performs an operation of tapping the application icon on the touch panel, the application program 82 is executed by the CPU 71 and the mobile application is executed.

Figure 3B:
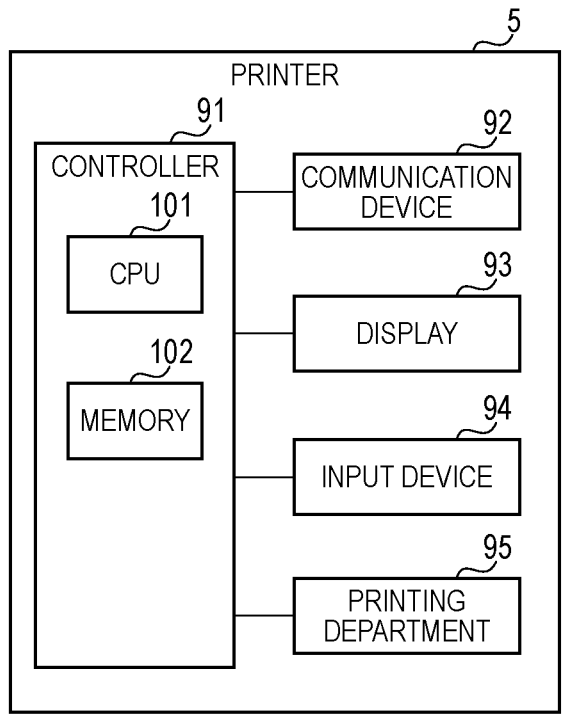
FIG. 3B is a block diagram showing a configuration of a printer.

The printer 5 is a small and lightweight mobile printer that can be carried by the operator. As shown in FIG. 3B, the printer 5 includes a controller 91, a communication device 92, a display 93, an input device 94 and a printing unit 95.

The controller 91 includes a CPU 101 and a memory 102. The CPU 101 is configured to execute a program stored in the memory 102, thereby implementing a variety of functions of the printer 5. Note that, a variety of functions implemented by the controller 91 are not limited to the configuration where they are implemented by the execution of the program. For example, some or all of the functions may also be implemented using one or more hardware. The memory 102 includes a semiconductor memory (for example, a ROM, a RAM, and a flash memory) that is a non-transitory tangible recording medium, and stores programs and data.

The communication device 92 is configured to perform data communication with the mobile terminal 4 by short-range wireless communication conforming to Bluetooth standards or wired communication using a USB.

The display 93 includes a display device (not shown), and is configured to display diverse images on the display device. The input device 94 includes a switch equipped at the periphery of the display screen of the display 93. The input device 94 is configured to output input operation information for specifying an input operation performed via the switch by the operator.

The printing unit 95 includes a heat-sensitive printing mechanism, and can print an image on a heat-sensitive roll sheet. Note that, the printing unit 95 may also be configured to perform printing on a cut sheet or to perform printing by a well-known recording method (for example, an inkjet method) other than the heat-sensitive method.

The web application of the terminal management apparatus 3 is configured to store a registration data table in the storage 35 so as to register, as a client, an apparatus that is managed by the terminal management apparatus 3.

The registration data table is provided for each apparatus that is managed by the terminal management apparatus 3, and includes a client ID, a client type, a client version and a client setting.

The client ID is inherent identification information that is allotted to each mobile application. The client ID may be an MAC address, a private IP address or a specific serial number. In FIG. 4, a MAC address is used as the client ID.

The client type is information indicating whether an apparatus corresponding to the client ID is the mobile terminal 4 or the printer 5. In a case that an apparatus corresponding to the client ID is the mobile terminal 4, the client type is a mobile application. In a case that an apparatus corresponding to the client ID is the printer 5, the client type is a printer.

The client version is information indicative of a version of a program stored in the apparatus corresponding to the client ID.

The client setting is information about a setting of the apparatus corresponding to the client ID.

(2) Processing that is Executed in Mobile Terminal 4

Subsequently, a sequence of reservation time setting processing that is executed by the CPU 71 of the mobile terminal 4 is described. The reservation time setting processing is processing that is repeatedly executed after the mobile application is activated by execution of the application program 82 until the mobile application is over.

Figure 5:
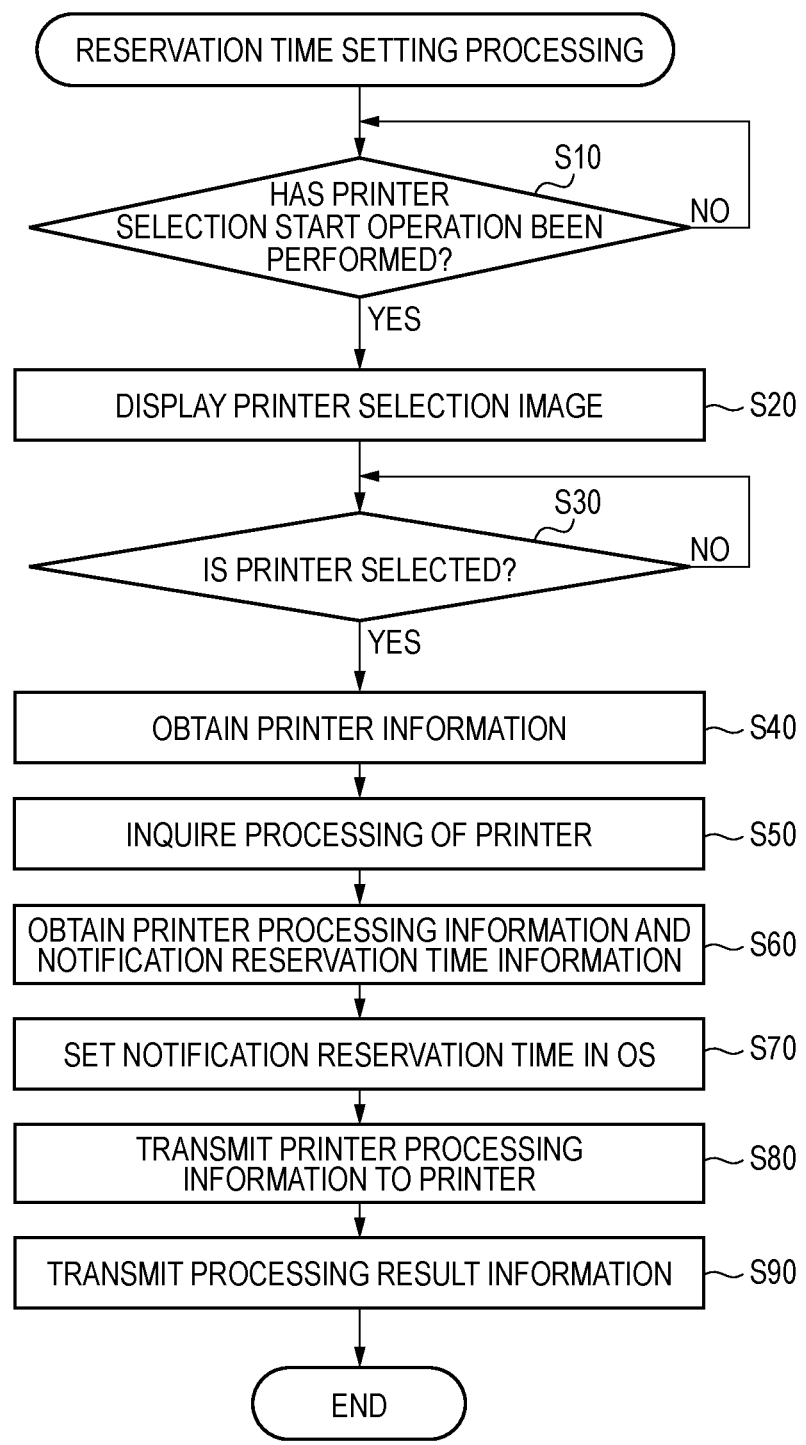
FIG. 5 is a flowchart showing reservation time setting processing.

As shown in FIG. 5, when the reservation time setting processing is executed, the CPU 71 first determines whether a printer selection start operation has been performed on the mobile terminal 4, in S10. Specifically, the CPU 71 determines whether input operation information indicative of the printer selection start operation has been input through the input device 64. When the input operation information indicative of the printer selection start operation is input, the CPU 71 determines that the printer selection start operation has been performed.

When the printer selection start operation has not been performed, the CPU 71 repeats the processing of S10 and stands by until the printer selection start operation is performed.

When the printer selection start operation is performed, the CPU 71 displays a printer selection image on the display screen of the display 63, in S20. The printer selection image displays one or more identification information for identifying one or more printers 5 communicatively connected to the mobile terminal 4. The printer selection image is configured such that one identification information can be selected from the one or more displayed identification information based on the input operation performed via the touch panel and the switch by the operator.

Then, the CPU 71 determines in S30 whether the printer 5 has been selected. Specifically, the CPU 71 determines whether input operation information indicative of the printer 5 selected on the printer selection image has been input through the input device 64. When the input operation information indicative of the selected printer 5 is input through the input device 64, the CPU 71 determines that the printer 5 has been selected. In the below, the printer 5 selected on the printer selection image is referred to as 'target printer'.

In a case that the printer 5 is not selected, the CPU 71 repeats the processing of S30 and stands by until the printer 5 is selected. In a case that the printer 5 is selected, the CPU 71 obtains information about the target printer (hereinafter, referred to as 'printer information') in S40. The printer information includes at least a device ID allotted to each printer 5.

In S40, the CPU 71 transmits a printer information request that requests the target printer to transmit printer information. Then, the CPU 71 receives the printer information from the target printer.

In S50, the CPU 71 transmits, to the terminal management apparatus 3, a processing inquiry for inquiring about processing that is to be executed by the target printer. The processing inquiry includes the printer information obtained in S40.

Then, in S60, the CPU 71 receives, from the terminal management apparatus 3, printer processing information indicative of processing that is to be executed by the target printer, and notification reservation time information indicative of a timing at which the mobile application is to be activated. In the present illustrative embodiment, the notification reservation time information indicates an elapsed time from a current time. Hereinafter, the elapsed time indicated by the notification reservation time information is referred to as notification reservation time. Note that, the notification reservation time information may indicate a time at which the mobile application is to be activated.

Then, in S70, the CPU 71 sets a notification reservation time in the OS of the mobile terminal 4. In S80, the CPU 71 transmits the printer processing information received from the terminal management apparatus 3 to the target printer. The target printer receiving the printer processing information executes processing indicated by the printer processing information, and transmits a processing result notification indicative of a processing result to the mobile terminal 4.

When the processing result notification is received from the target printer, the CPU 71 transmits the processing result notification to the terminal management apparatus 3, in S90, and ends the reservation time setting processing.

Subsequently, a sequence of reservation notification processing that is executed by the CPU 71 of the mobile terminal 4 is described. The reservation notification processing is processing that is repeatedly executed after the OS of the mobile terminal 4 is activated as a result of execution of the OS program 81 until the OS is over.

Figure 6:
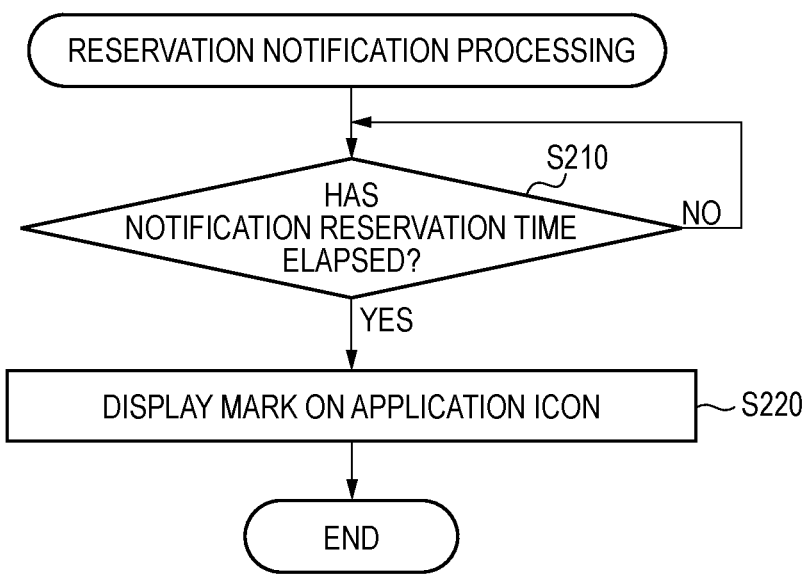
FIG. 6 is a flowchart showing reservation notification processing.

As shown in FIG. 6, when the reservation notification processing is executed, the CPU 71 first determines whether the notification reservation time has elapsed after the notification reservation time has been set in S70, in S210. When the notification reservation time has not elapsed, the CPU 71 repeats the processing of S210 and stands by until the notification reservation time elapses.

Figure 7:
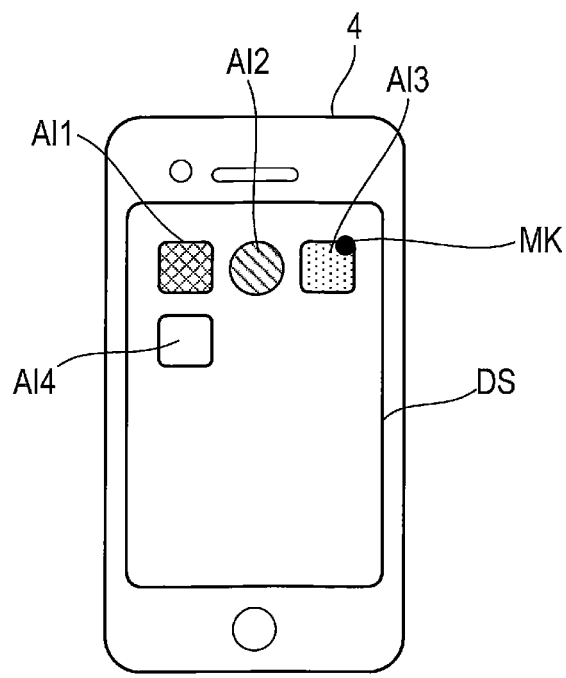
FIG. 7 shows an application icon and a mark.

When the notification reservation time has elapsed, the CPU 71 displays a mark on the application icon of the mobile application, in S220, and ends the reservation notification processing. Specifically, as shown in FIG. 7, for example, the CPU 71 additionally displays a mark image MK on an application icon AI3 of the mobile application among a plurality of application icons AI1, AI2, AI3 and AI4 displayed on the display screen DS of the mobile terminal 4.

(3) Processing that is Executed in Centralized Management Apparatus 2

Subsequently, a sequence of reservation time instruction processing that is executed by the CPU 21 of the centralized management apparatus 2 is described. The reservation time instruction processing is processing that is repeatedly executed during operations of the controller 11.

Figures 8, 9:
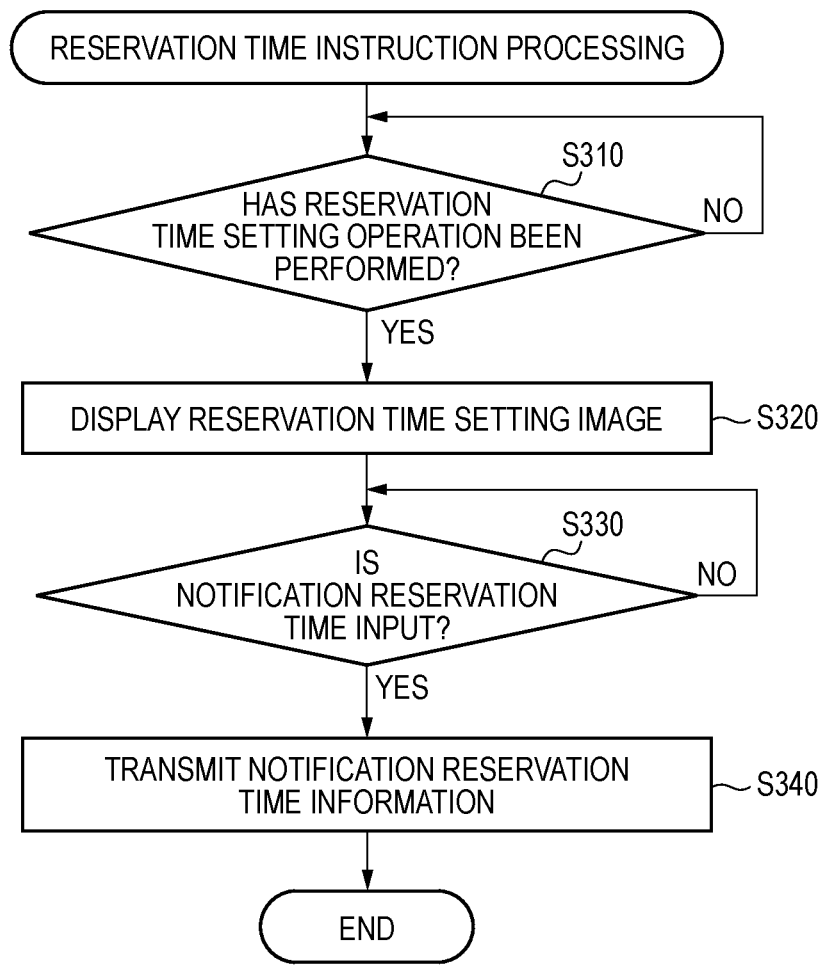
FIG. 8 is a flowchart showing reservation time instruction processing.
FIG. 9 shows a notification reservation data table.

As shown in FIG. 8, when the reservation time instruction processing is executed, the CPU 21 first determines whether a reservation time setting operation has been performed for the centralized management apparatus 2, in S310. Specifically, the CPU 21 determines whether input operation information indicative of the reservation time setting operation has been input through the input device 14. When the input operation information indicative of the reservation time setting operation is input, the CPU 21 determines that the reservation time setting operation has been performed.

When the reservation time setting operation has not been performed, the CPU 21 repeats the processing of S310 and stands by until the reservation time setting operation is performed.

When the reservation time setting operation is performed, the CPU 21 displays a reservation time setting image on the display screen of the display 13, in S320. The reservation time setting image is configured such that a notification reservation time can be input based on an input operation performed via the keyboard and the mouse by the operator of the centralized management apparatus 2.

Then, the CPU 21 determines in S330 whether the notification reservation time has been input. Specifically, the CPU 21 determines whether input operation information indicative of the notification reservation time has been input through the input device 14. When the input operation information indicative of the notification reservation time is input through the input device 14, the CPU 21 determines that the notification reservation time has been input.

When the notification reservation time has not been input, the CPU 21 repeats the processing of S330 and stands by until the notification reservation time is input.

When the notification reservation time is input, the CPU 21 transmits notification reservation time information indicative of the notification reservation time input through the input device 14 to the terminal management apparatus 3, in S340, and ends the reservation time instruction processing.

The notification reservation time information is indicated in a form of a notification reservation data table shown in FIG. 9. The notification reservation data table includes an action ID, an action type and action contents.

The action ID is inherent identification information that is allotted to each action. The action may include changing or deleting a setting value that is used in the apparatus, for example. The action may also include at least one of update, deletion and new install of software that is used in the apparatus.

The action type is information for specifying a content of the action. In FIG. 9, the action type is 'ReserveNotification' indicative of a reservation time notification. Note that, the action type may also be an index number such as 1, 2, . . . .

The action contents are information that is used in the action specified by the action type. In FIG. 9, information indicative of a reservation time is set for the action contents.

(4) Operation Example of Terminal Management System 1

Subsequently, a specific example of the operations of the terminal management system 1 is described.

Figure 10:
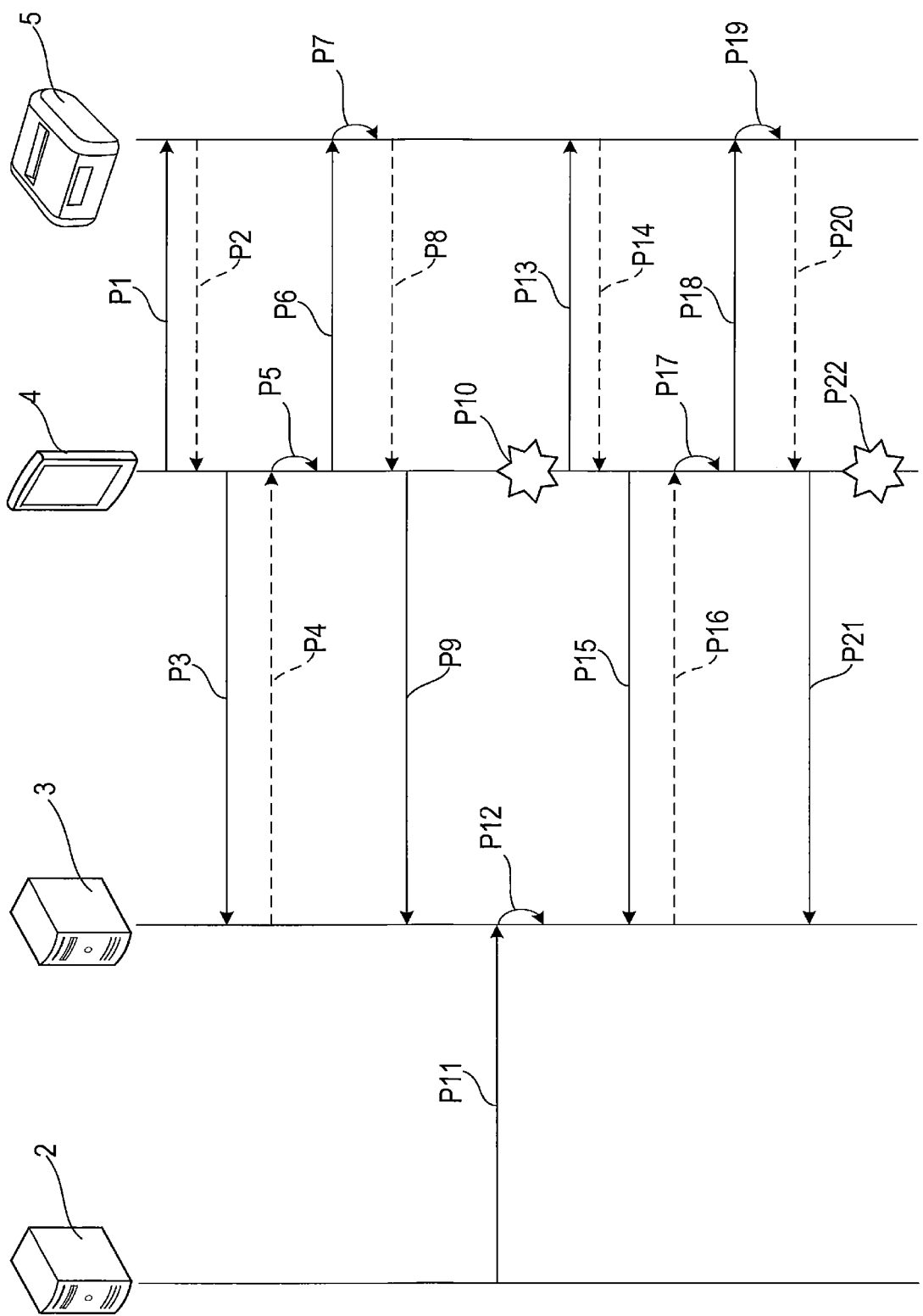
FIG. 10 is a sequence diagram showing a specific example of operations of the terminal management system.

As shown in FIG. 10, the mobile terminal 4 first transmits a printer information request to the printer 5, as shown in processing P1. The printer 5 receiving the printer information request transmits printer information to the mobile terminal 4, as shown in processing P2.

The mobile terminal 4 receiving the printer information transmits a processing inquiry to the terminal management apparatus 3, as shown in processing P3. The terminal management apparatus 3 receiving the processing inquiry transmits printer processing information and notification reservation time information to the mobile terminal 4, as shown in processing P4.

The mobile terminal 4 receiving the printer processing information and the notification reservation time information sets the notification reservation time indicated by the received notification reservation time information in the OS of the mobile terminal 4, as shown in processing P5. The mobile terminal 4 transmits the received printer processing information to the printer 5, as shown in processing P6.

The printer 5 receiving the printer processing information executes processing indicated by the received printer processing information, as shown in processing P7. When the processing is completed, the printer 5 transmits a processing result notification to the mobile terminal 4, as shown in processing P8.

The mobile terminal 4 receiving the processing result notification transmits the processing result notification to the terminal management apparatus 3, as shown in processing P9.

When the notification reservation time elapses, the mobile terminal 4 displays the mark image MK on the application icon AI3 of the mobile application, as shown in processing P10.

Then, when the input operation information indicative of the notification reservation time is input to the centralized management apparatus 2, the centralized management apparatus 2 transmits the notification reservation time information to the terminal management apparatus 3, as shown in processing P11.

The terminal management apparatus 3 receiving the notification reservation time information updates the notification reservation time, as shown in processing P12.

Also, the mobile terminal 4 transmits the printer information request to the printer 5, as shown in processing P13.

The printer 5 receiving the printer information request transmits the printer information to the mobile terminal 4, as shown in processing P14.

The mobile terminal 4 receiving the printer information transmits a processing inquiry to the terminal management apparatus 3, as shown in processing P15. The terminal management apparatus 3 receiving the processing inquiry transmits the printer processing information and the notification reservation time information to the mobile terminal 4, as shown in processing P16. Note that, the notification reservation time information that is transmitted at this time indicates the updated notification reservation time.

The mobile terminal 4 receiving the printer processing information and the notification reservation time information sets the notification reservation time indicated by the received notification reservation time information in the OS of the mobile terminal 4, as shown in processing P17. The mobile terminal 4 also transmits the received printer processing information to the printer 5, as shown in processing P18.

The printer 5 receiving the printer processing information executes processing indicated by the received printer processing information, as shown in processing P19. When the processing is completed, the printer 5 transmits a processing result notification to the mobile terminal 4, as shown in processing P20.

The mobile terminal 4 receiving the processing result notification transmits the processing result notification to the terminal management apparatus 3, as shown in processing P21.

When the updated notification reservation time elapses, the mobile terminal 4 displays the mark image MK on the application icon AI3 of the mobile application, as shown in processing P22.

(5) Advantages

The mobile terminal 4 of the terminal management system 1 configured as described above is configured to perform communication with the printer 5 and with the terminal management apparatus 3, and includes the controller 61. The controller 61 is configured to execute obtainment processing and reservation processing.

The obtainment processing obtains, from the terminal management apparatus 3, the notification reservation time information, which indicates an execution timing of the mobile application configured to be activated by an activation operation that is performed on the mobile terminal 4 by the user of the mobile terminal 4 and also configured to relay data between the terminal management apparatus 3 and the printer 5 via the mobile terminal 4.

The reservation processing performs, based on the notification reservation time information obtained in the obtainment processing, a reservation setting for setting the notification reservation time in the OS of the mobile terminal 4 so as to execute display processing of displaying, on the mobile terminal 4, the mark image MK for prompting the user to activate the mobile application when the execution timing comes.

In this way, the mobile terminal 4 can display the mark image MK on the mobile terminal 4 when the execution timing designated on the terminal management apparatus 3-side comes. Accordingly, the mobile terminal 4 can increase the frequency of causing the user of the mobile terminal 4 to recognize the mark image MK displayed on the mobile terminal 4 at the execution timing and causing the user of the mobile terminal 4 to execute the activation operation of the mobile application at the execution timing. Specifically, the mobile terminal 4 can increase the frequency that the mobile application is activated when the execution timing designated on the terminal management apparatus 3-side comes. Thereby, the mobile terminal 4 can suppress occurrence of a situation where data cannot be relayed between the terminal management apparatus 3 and the printer 5, and can improve reliability of management on the printer 5 by the terminal management apparatus 3.

The controller 61 of the mobile terminal 4 is configured to execute instruction request transmission processing. The instruction request transmission processing transmits, to the terminal management apparatus 3, a processing inquiry for requesting an instruction of processing that is executed by the printer 5. The obtainment processing obtains, from the terminal management apparatus 3, the notification reservation time information after executing the instruction request transmission processing. Thereby, the mobile terminal 4 can obtain the notification reservation time information without requesting the notification reservation time information from the terminal management apparatus 3, and therefore, can reduce a processing load of the mobile terminal 4.

The centralized management apparatus 2 is configured to perform communication with the mobile terminal 4 configured to perform communication with the printer 5, via the terminal management apparatus 3.

The centralized management apparatus 2 includes the input device 14 configured to output the input operation information for specifying an input operation performed by the operator of the centralized management apparatus 2, and the controller 11. The controller 11 is configured to execute change processing and transmission processing. The change processing changes the notification reservation time, based on the input operation information from the input device 14. The transmission processing transmits the notification reservation time information indicative of the notification reservation time changed in the change processing to the mobile terminal 4 via the terminal management apparatus 3.

In this way, the centralized management apparatus 2 can transmit the notification reservation time information indicative of the changed notification reservation time to the mobile terminal 4. Accordingly, the centralized management apparatus 2 can change the execution timing for displaying the mark image MK, as required.

In the illustrative embodiment described above, the application program 82 corresponds to the display control program, the centralized management apparatus 2 and the terminal management apparatus 3 correspond to the management apparatus, the mobile terminal 4 corresponds to the relay apparatus, the printer 5 corresponds to the terminal apparatus, and the controller 61 corresponds to the relay controller.

S60 corresponds to the obtainment processing and the obtainment step, S70 corresponds to the reservation processing and the reservation step, the mobile application corresponds to the relay application, the notification reservation time information corresponds to the execution timing information, the mark image MK corresponds to the activation notification image, and S210 and S220 correspond to the display processing.

S50 corresponds to the instruction request transmission processing, the processing inquiry corresponds to the instruction request, S10 to S30 correspond to the selection processing, and the printer processing information corresponds to the execution processing information.

The controller 11 corresponds to the management controller, S310 to S330 corresponds to the change processing, and S340 corresponds to the transmission processing.

Although the illustrative embodiment of the present disclosure has been described, the present invention is not limited to the above illustrative embodiment and can be variously modified and implemented.

Modified Illustrative Embodiment 1

For example, in the above illustrative embodiment, the aspect where the plurality of terminals 4 and the plurality of printers 5 are provided has been described. However, the terminal management system 1 may also include one mobile terminal 4 and one printer 5.

Modified Illustrative Embodiment 2

In the above illustrative embodiment, the aspect where the centralized management apparatus 2 sets the notification reservation time has been described. However, the terminal management apparatus 3 may also be configured to set the notification reservation time.

Modified Illustrative Embodiment 3

In the above illustrative embodiment, the aspect where the terminal management apparatus 3 and the mobile terminal 4 are configured to perform communication with each other via the WAN 7 has been described. However, the terminal management apparatus 3 and the mobile terminal 4 can also be communicatively connected to each other via the same LAN. The LAN is an abbreviation of Local Area Network.

Modified Illustrative Embodiment 4

In the above illustrative embodiment, the aspect where when the execution timing comes, the mark image is displayed on the mobile terminal 4 has been described. However, instead of the mark image, a message "it is time for regular execution", for example, may be displayed. Also, instead of displaying the mark image, the mobile terminal 4 may be caused to vibrate. Further, the mobile terminal 4 may be caused to vibrate, in addition to the display of the mark image.

The above-described illustrative aspect of the present disclosure may provide a management apparatus configured to perform communication with a relay apparatus that is configured to perform communication with a terminal apparatus, the relay apparatus being configured to: obtain execution timing information from the management apparatus, the execution timing information indicating an execution timing of a relay application, the relay application being configured to relay data between the management apparatus and the terminal apparatus via the relay apparatus, the relay application being activated by a user's activation operation performed on the relay apparatus; and based on the execution timing information obtained, set a reservation for executing display processing when the execution timing comes, the display processing including displaying, on the relay apparatus, an activation notification image prompting the user to activate the relay application, the management apparatus including: an input interface configured to receive an input operation performed by an operator of the management apparatus and to output input operation information for specifying the input operation; and a controller configured to: change the execution timing based on the input operation information from the input interface; and transmit the execution timing information indicating the changed execution timing to the relay apparatus.

According thereto, it may transmit the execution timing information indicative of the changed execution timing to the relay apparatus. Accordingly, it may change the execution timing for displaying the activation notification image, as required.

In the above illustrative embodiment, the plurality of functions of one composition element may be implemented by the plurality of composition elements, or one function of one composition element may be implemented by the plurality of composition elements. In addition, the plurality of functions of the plurality of composition elements may be implemented by one composition element, or one function that is implemented by the plurality of composition element may be implemented by one composition element. Further, some of the configurations of the above illustrative embodiment may be omitted. In addition, at least some of the configurations of the above illustrative embodiment may be added or replaced with respect to the other illustrative embodiments.

In addition to the mobile terminal 4, the present disclosure can be implemented in various aspects, such as a system including the mobile terminal 4 as a composition element, a program for causing a computer to function as the mobile terminal 4, a non-transitory tangible recording medium such as a semiconductor memory in which the program is recorded, a display control method, and the like.

What is claimed is:

1. A non-transitory computer-readable medium storing a display control program readable by a computer of a relay apparatus of a terminal management system, the terminal management system having a management apparatus, the relay apparatus, and a terminal apparatus, the management apparatus and the relay apparatus being configured to perform communication with each other, the relay apparatus and the terminal apparatus being configured to perform communication with each other, the display control program, when executed by the computer, causing the relay apparatus to perform:

obtaining execution timing information from the management apparatus, the execution timing information indicating an execution timing of a relay application, the relay application being configured to relay data between the management apparatus and the terminal apparatus via the relay apparatus, and the relay application being activated by a user's activation operation performed on the relay apparatus; and based on the execution timing information obtained, setting a reservation for executing display processing when the execution timing comes, the display processing comprising displaying, on the relay apparatus, an activation notification image prompting the user to activate the relay application.

2. The non-transitory computer-readable medium according to claim 1, wherein the display control program, when executed by the computer, further causes the relay apparatus to perform:

transmitting, to the management apparatus, an instruction request requesting an instruction of processing that is to be executed by the terminal apparatus, and wherein the obtaining of the execution timing information comprises obtaining the execution timing information from the management apparatus after transmitting the instruction request.

3. The non-transitory computer-readable medium according to claim 2, wherein the display control program, when executed by the computer, further causes the relay apparatus to perform:

enabling the user to select a target terminal apparatus, which is the terminal apparatus becoming a target of the instruction request, after the relay application is activated, wherein the transmitting of the instruction request comprises transmitting the instruction request of the selected target terminal apparatus to the management apparatus, and wherein the obtaining of the execution timing information comprises obtaining, from the management apparatus, the execution timing information together with execution processing information indicating the processing that is to be executed by the terminal apparatus.

4. A relay apparatus configured to perform communication with a terminal apparatus and to perform communication with a management apparatus, the relay apparatus comprising:

a display;
an input interface; and
a controller configured to:

obtain execution timing information from the management apparatus, the execution timing information indicating an execution timing of a relay application, the relay application being configured to relay data between the management apparatus and the terminal apparatus via the relay apparatus, the relay application being activated by a user's activation operation performed on the input interface; and based on the execution timing information obtained, set a reservation for executing display processing when the execution timing comes, the display processing comprising displaying, on the display, an activation notification image prompting the user to activate the relay application.

5. The relay apparatus according to claim 4, wherein the controller is further configured to:

transmit, to the management apparatus, an instruction request requesting an instruction of processing that is to be executed by the terminal apparatus, and wherein in the obtaining of the execution timing information, the controller is configured to obtain the execution timing information from the management apparatus after transmitting the instruction request.

6. The relay apparatus according to claim 5, wherein the controller is further configured to:

enable the user to select a target terminal apparatus, which is the terminal apparatus becoming a target of the instruction request, after the relay application is activated, wherein in the transmitting of the instruction request, the controller is configured to transmit the instruction request of the selected target terminal apparatus to the management apparatus, and wherein in the obtaining of the execution timing information, the controller is configured to obtain, from the management apparatus, the execution timing information together with execution processing information indicating the processing that is to be executed by the terminal apparatus.

7. A display control method executed by a relay apparatus, the relay apparatus being configured to perform communication with a terminal apparatus and to perform communication with a management apparatus, the display control method comprising:
- obtaining execution timing information from the management apparatus, the execution timing information indicating an execution timing of a relay application, the relay application being configured to relay data between the management apparatus and the terminal apparatus via the relay apparatus, the relay application being activated by a user's activation operation performed on the relay apparatus; and
- based on the execution timing information obtained, setting a reservation for executing display processing when the execution timing comes, the display processing comprising displaying, on the relay apparatus, an activation notification image for prompting the user to activate the relay application.

8. The display control method according to claim 7, further comprising:
- transmitting, to the management apparatus, an instruction request requesting an instruction of processing that is to be executed by the terminal apparatus,
- wherein the obtaining of the execution timing information comprises obtaining the execution timing information from the management apparatus after transmitting the instruction request.

9. The display control method according to claim 8, further comprising:
- enabling the user to select a target terminal apparatus, which is the terminal apparatus becoming a target of the instruction request, after the relay application is activated,
- wherein the transmitting of the instruction request comprises transmitting the instruction request of the selected target terminal apparatus to the management apparatus, and
- wherein the obtaining of the execution timing information comprises obtaining, from the management apparatus, the execution timing information together with execution processing information indicating the processing that is to be executed by the terminal apparatus.

* * * * *